United States Patent [19]

Mitake

[11] Patent Number: 4,910,531
[45] Date of Patent: Mar. 20, 1990

[54] IMAGE RECORDER WITH A TRANSFORMER HAVING PARALLEL LEAKAGE FLUXES

[75] Inventor: Akira Mitake, Minamiashigara, Japan

[73] Assignee: Fuji Photo Film Co., Ltd., Kanagawa, Japan

[21] Appl. No.: 234,663

[22] Filed: Aug. 22, 1988

[30] Foreign Application Priority Data

Aug. 21, 1987 [JP] Japan .............................. 62-207782

[51] Int. Cl.⁴ ...................... G01D 15/14; H01J 29/56; H01J 29/70
[52] U.S. Cl. ............................... 346/108; 346/110 R; 315/370; 315/411
[58] Field of Search ................... 346/107 R, 108, 160, 346/110 R; 315/411, 370

[56] References Cited

U.S. PATENT DOCUMENTS 4,644,230 2/1987 Federle .............................. 315/411
4,695,142 9/1987 Holt ................................. 346/110 R Primary Examiner—Bruce A. Reynolds
Assistant Examiner—Mark Reinhart
Attorney, Agent, or Firm—Sughrue, Mion, Zinn, Macpeak & Seas

[57] ABSTRACT

An image photographing apparatus photographs an image displayed by a display unit such as a CRT monitor on a photosensitive medium such as a photographic film. The displayed image is formed on the photosensitive medium by an image-forming optical mechanism which includes the display unit for displaying the image with an electron beam. A transformer for producing a desired voltage for energizing the image photographing apparatus is substantially spaced from the display unit and oriented such that leakage fluxes from the transformer will be directed substantially parallel to the electron beam in the display unit, for allowing the image to be displayed by the display unit with high accuracy without being adversely affected by the leakage fluxes.

6 Claims, 2 Drawing Sheets

IMAGE RECORDER WITH A TRANSFORMER HAVING PARALLEL LEAKAGE FLUXES

BACKGROUND OF THE INVENTION

The present invention relates to an image photographing apparatus, and more particularly to an image photographing apparatus including a transformer as a power supply for energizing the image photographing apparatus, the transformer being spaced from an image monitor as much as possible and oriented such that the direction of leakage fluxes from the transformer will be substantially parallel to the direction of an electron beam radiated in a display tube for allowing an image to be displayed accurately on the monitor.

There have widely been used in recent years image processing systems in which image information created by computerized tomography (CT) is displayed on a CRT monitor and photographed on a photographic photosensitive medium by an image photographing apparatus. The image processing system includes the image photographing apparatus, an image input unit such as a medical diagnostic unit, an image information processing unit for processing image information from the image input unit to produce an image to be displayed on the CRT monitor, and an automatic image developing unit for developing photographed images on the photosensitive medium.

In the image photographing apparatus, the photosensitive medium such as a photographic film supplied from a supply magazine is exposed to a plurality of images displayed on the CRT monitor. More specifically, a photographic film supplied from the supply magazine is fed by a film feed mechanism into an image forming region in which the film is positioned in place by a film presser plate which is displaceable vertically toward and away from the film.

The CRT monitor which serves as a light source for producing image information and a focusing or image forming lens jointly serve as an image-forming optical mechanism in the image forming region. A plurality of pieces of image information which are successively displayed on the CRT monitor are successively photographed on the film in respective areas thereon by the image-forming optical mechanism.

The film on which the pieces of information are photographed is then released by moving the film presser plate downwardly, and delivered by the film feed mechanism into a receiving magazine positioned substantially horizontally below the supply magazine. Then, the film is transferred into the automatic image developing unit. Alternatively, the film may be transferred from the image forming region directly into the automatic image developing unit.

The CRT monitor in the image photographing apparatus is generally energized by a direct current under a relatively low voltage. To obtain such a direct current from a commercial AC power supply having a voltage of 100 V, for example, the voltage of 100 V has to be dropped to a certain voltage, and then the alternating current has to be rectified. Consequently, the image photographing apparatus requires a transformer for reducing the voltage of the commercial power supply.

Since the transformer increases or reduces the applied voltage through electromagnetic induction, magnetic fluxes leaked from the transformer are present around the transformer. The flux leakage tends to cause the electron beam which is cyclically deflected in the CRT monitor to be displaced out of position, thus disturbing the image displayed on the CRT screen.

When an image displayed on the CRT screen is photographed or recorded on the film for use in medical diagnosis, the raster on the CRT screen will present an obstacle to the process of diagnosis based on a visual inspection of the displayed image. Such a problem is solved by interpolating the raster to make it less noticeable. However, if the electron beam is undesirably displaced under the influence of the flux leakage from the nearby transformer, then it becomes impossible to effect the interpolation for rendering the raster less conspicuous. One solution is to surround the CRT monitor or the transformer with a magnetic shield made of a ferromagnetic material to permit a desired image to be displayed with accuracy on the CRT screen. This proposal is however disadvantageous in that since the ferromagnetic material is comparatively expensive, the cost of manufacture of the image photographing apparatus is likewise comparatively expensive, and is increased in weight.

SUMMARY OF THE INVENTION

It is a major object of the present invention to provide an image photographing apparatus including a transformer as a power supply for lowering a relatively high voltage down to a prescribed voltage to energize the image photographing apparatus, the transformer being spaced from an image monitor as much as possible and oriented so that the direction of leakage fluxes from the transformer will be substantially parallel to the direction of travel of an electron beam within the monitor for allowing an image to be displayed accurately on the monitor, with the result that the image photographing apparatus can be manufactured economically.

Another object of the present invention is to provide an image photographing apparatus for photographing an image on a photosensitive medium, comprising: an image-focusing optical mechanism for focusing the image of a displayed image on the photosensitive medium, the image-focusing optical mechanism including said display unit for displaying the image with an electron beam; and a transformer for producing a desired voltage for energizing the image photographing apparatus, the transformer being spaced from the display unit and oriented such that leakage fluxes from the transformer will be directed substantially parallel to the direction of a electron beam in the display unit.

Still another object of the present invention is to provide an image photographing apparatus for photographing an image on a photosensitive medium, wherein the transformer comprises a cut-core transformer.

Yet another object of the present invention is to provide an image photographing apparatus for photographing an image on a photosensitive medium, wherein the cut-core transformer comprises a pair of cores and a pair of coils wound respectively on the cores, the coils being juxtaposed in a direction toward the electron beam in the display unit.

Yet another object of the present invention is to provide an image photographing apparatus for photographing an image on a photosensitive medium, wherein said display unit including a cathode ray tube having substantially a horizontal displaying surface is placed in a lower part of said apparatus and said transformer is placed at the top of said apparatus.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
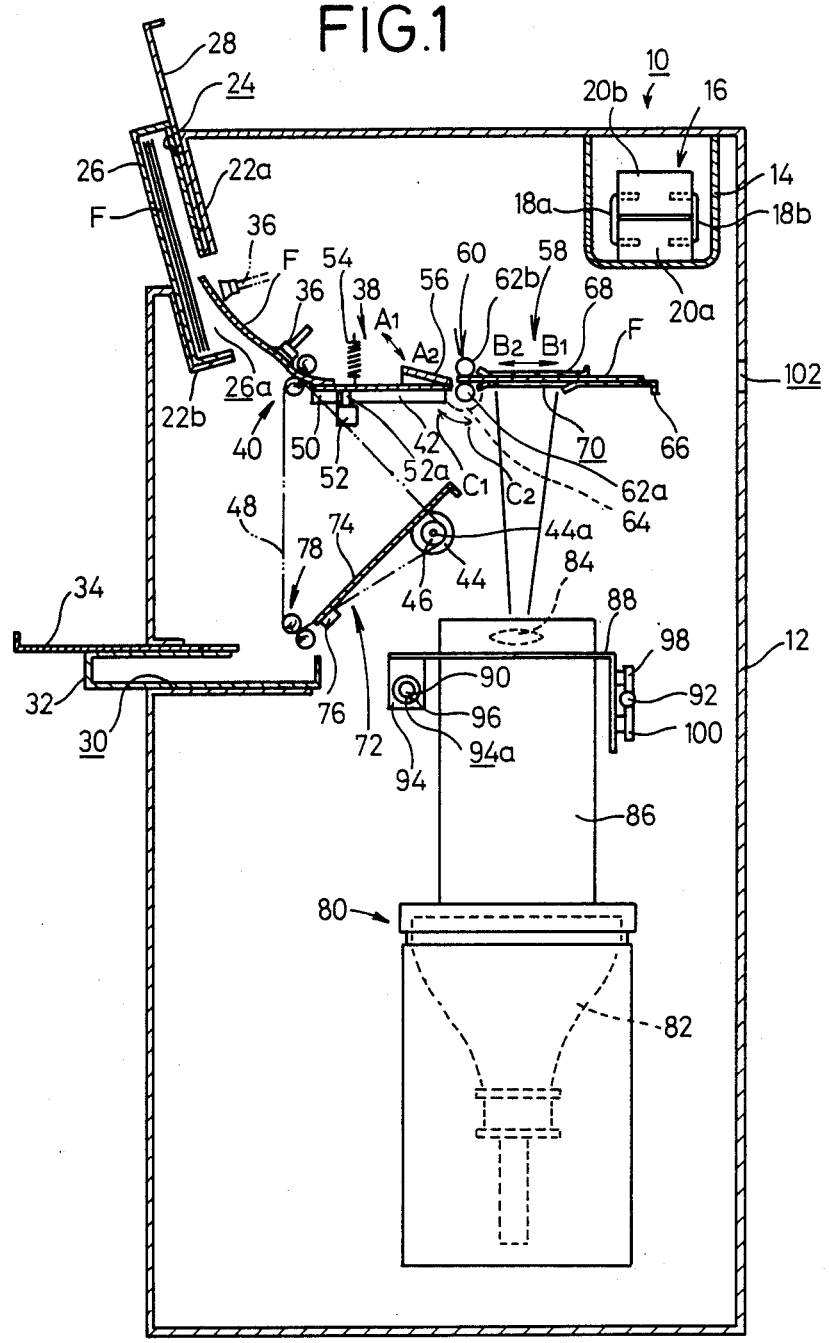
FIG. 1 is a schematic vertical cross-sectional view of an image photographing apparatus according to the present invention.

As illustrated in FIG. 1, an image photographing apparatus 10 according to the present invention has a box-shaped housing 12. A transformer attachment 14 having a U-shaped cross section is fixed to the inner surface of an upper panel of the housing 12 near an upper righthand corner (as shown) of the housing 12. A cut-core transformer 16 mounted in the transformer attachment 14 has a pair of laterally spaced cores 18a, 18b and a pair of vertically arranged coils 20a, 20b wound around the cores 18a, 18b, the coils 20a, 20b being juxtaposed in a direction toward an electron beam produced in a CRT monitor described later on.

The housing 12 has a slot 24 defined in an upper lefthand corner by a slanted plate 22a and a bent plate 22b for receiving a supply magazine 26 in a light-shielding manner. More specifically, the supply magazine 26 is inserted into the slot 24 until the leading end of the supply magazine 26 reaches the bent end of the bent plate 22b whereupon the supply magazine 26 is fully loaded in the slot 24 while shielding the slot 24 against entry of any extraneous light. The supply magazine 26 contains a stack of photographic films F and has an opening 26a which is openably closed by a shutter 28.

The housing 12 also has a slot 30 defined substantially centrally in a side wall thereof. A receiver magazine 32 can be mounted in the slot 30 in a light-shielding fashion, the receiver magazine 32 having a shutter 34 for closing its opening.

A sheet delivery mechanism including a suction cup 36 is disposed in the housing 12 near the film access opening 26a of the supply magazine 26. The suction cup 36 can be moved along a predetermined path toward a first feed mechanism 38 by an actuator means (not shown).

The first feed mechanism 38 includes a first roller pair 40 and a guide plate 42, the first roller pair 40 comprising a pair of rollers rotatably supported on and extending between a pair of laterally spaced vertical side plates (not shown) of the housing 12. A chain 48 is trained around one of the rollers of the first roller pair 40, a sprocket 46 mounted on the drive shaft 44a of a motor 44, and one of rollers of a second roller pair (described later). The guide plate 42 is angularly movably supported at one end on the side plates of the housing 12. A limit switch 50 is mounted on the lower surface of the guide plate 42, which engages a rod 52a of a solenoid 52. The limit switch 50 can detect whether there is a photographic film F placed on the guide plate 42.

The guide plate 42 is normally urged to move upwardly by a tension spring 54 engaging the guide plate 42. Therefore, the other end of the guide plate 42 is angularly movable about its one end in the direction of the arrow $A_1$ under the bias of the tension spring 54, and is also angularly movable in the direction of the arrow $A_2$ by the rod 52a in response to energization of the solenoid 52. Another guide plate 56 is disposed on the guide plate 42 at its other end, the guide plate 56 having a large opening in its upstream end (lefthand end in FIG. 1) and slanting from the large opening toward the downstream end. The guide plate 56 thus guides the film F therethrough from the opening thereof.

An image positioning mechanism 58 is disposed in the vicinity of the first feed mechanism 38. The image positioning mechanism 58 includes a constant feed roller pair 60 for feeding the film F in the direction of the arrow $B_1$ and also for feeding the film F a prescribed interval at a time in the direction of the arrow $B_2$. The constant feed roller pair 60 comprises a pair of rollers 62a, 62b. The roller 62a has an end directly coupled to a stepping motor 64. Guide plates 66, 68 are disposed adjacent to the constant feed roller pair 60 with their ends confronting the rollers 62a, 62b. The guide plates 66, 68 are substantially parallel to and vertically spaced from each other by a distance that is slightly larger than the thickness of the film F. Therefore, even if the film F is fed into the gap between the guide plates 66, 68 while the film F is being flexed, the film F is corrected out of the flexed condition and hence kept flatwise by the guide plates 66, 68 so that desired image information will not be defocused on the film F. The guide plate 66, positioned below the guide plates 68, has an opening 70 defined therein near the constant feed roller pair 60. The film F sandwiched between the guide plates 66, 68 can be exposed to light applied from below the guide plate 66 through the opening 70.

The film F on which a desired image is photographed while the film F is being positioned by the image positioning mechanism 58 is then fed toward a second feed mechanism 72. The second feed mechanism 72 includes a slanted guide plate 74 for holding the film F sent from the image positioning mechanism 58 and for guiding the film F in a predetermined direction. A limit switch 76 is attached to the lower surface of the guide plate 74 near one end thereof. The limit switch 74 can detect whether there is a photographic film F placed on the guide plate 74.

The second feed mechanism 66 also includes a second roller pair 78 positioned in slightly spaced relation to the guide plate 74 and above the receiver magazine 32. As described above, the chain 48 trained around one roller of the first roller pair 40 and the sprocket 46 on the drive shaft 44a of the motor 44 is also trained around one roller of the second roller pair 78. Therefore, when the chain 48 is driven to run by the motor 44, the rollers of the second roller pair 78 is rotated about their own axes in the directions of the arrows to feed the film F from the second feed mechanism 72 into the receiver magazine 32.

An image-forming optical mechanism 80 is located below the image positioning mechanism 58. The optical mechanism 80 includes a CRT monitor 82 for displaying a desired image, and a lens holder 86 disposed upwardly of the CRT monitor 82 and holding a focusing or image forming lens 84. The focusing lens 84 held in the lens holder 86 is vertically displaceable. The lens holder 86 is supported on substantially parallel guide rods 90, 92 mounted on the side panels of the housing 12, through an attachment plate 88 mounted on an upper portion of the lens holder 86. The attachment plate 88 has a guide 94 on one end, having a hole 94a defined therein. A cylindrical sleeve 96 is fitted in the hole 94a and slidably over the guide rod 90. The other end of the attachment plate 88 is bent at a substantially right angle into a downwardly directed portion to which there are attached a guide roller 98 positioned upwardly of and held in rolling contact with the guide rod 92 and a guide roller 100 positioned downwardly of and held in rolling contact with the guide rod 92. Therefore, the image-forming optical mechanism 80 is displaceable by an actuator (not shown) along the guide rods 90, 92 in a direction normal to the sheet of FIG. 1.

The side wall of the housing 12 remote from the slot 24 has a slot 102 defined therein for passage therethrough of the film F toward an automatic image developing apparatus (not shown) connected to the image photographing apparatus 10. If the image photographing apparatus 10 is used alone without such an automatic image developing apparatus, then the slot 146 is closed off by a light-shielding member (not shown).

Operation and advantages of the image photographing apparatus 10 thus constructed will be described below.

The supply magazine 26 with a stack of photographic films F stored therein is loaded into the slot 24 in the light-shielding manner, and the receiver magazine 32 is also loaded into the slot 30 in the light-shielding fashion. When the supply magazine 26 and the receiver magazine 32 are loaded, their shutters 28, 34 are operated to open the openings of these magazines.

The suction cup 36 of the sheet delivery mechanism is operated to pick up the uppermost film F from the film stack in the supply magazine 26, and then supply the film F to the first roller pair 40. The motor 44 is energized to rotate the sprocket 46 on the drive shaft 44a thereof and the first roller pair 40 in the directions of the arrows. The film F is thus gripped and fed by the first roller pair 40 until it triggers the limit switch 50 to de-energize the motor 44. Then, the solenoid 52 is energized to displace the rod 52a thereof downwardly for angularly moving the guide plate 42 in the direction of the arrow $A_2$ against the bias of the tension spring 54.

The motor 44 is energized again to rotate the first roller pair 40 in the directions of the arrows, and the stepping motor 64 of the image positioning mechanism 58 is energized to rotate the roller 62a of the constant feed roller pair 60 in the direction of the arrow $C_1$. The film F is therefore fed in the direction of the arrow $B_1$ while being gripped by the constant feed roller pair 60, until the film F reaches a position between the guide plates 66, 68 of the image positioning mechanism 58. When the film F between the guide plates 66, 68 is detected by a sensor (not shown), the motor 44, the stepping motor 64, and the solenoid 52 are de-energized. At this time, the trailing end of the film F is held at rest while being gripped by the constant feed roller pair 60. Upon de-energization of the solenoid 52, the guide plate 42 is angularly displaced in the direction of the arrow $A_1$ under the resiliency of the tension spring 54.

Now, an image displayed by the CRT monitor 82 of the image-forming optical mechanism 80 is photographed or recorded on the film F thus positioned in the image positioning mechanism 58 through the focusing lens 84 and the opening 70. After the film F has been exposed to the image, the image-forming optical mechanism 80 is moved by the non-illustrated actuator in a direction normal to the sheet of FIG. 1, and the CRT monitor 82 displays another image. This other image is then photographed or recorded on the film F in another area in the same manner as described above. In this fashion, a plurality of images are photographed or recorded on the film F in respective areas near the contant feed roller pair 60. Thereafter, the stepping motor 64 directly coupled to the constant feed motor roller 60 is energized to rotate the roller 62a in the direction of the arrow $C_2$ to move the film F a prescribed distance in the direction of the arrow $B_2$. Since the guide plate 42 of the first feed mechanism 38 has been displaced in the direction of the arrow $A_1$ at this time, the portion of the film F on which the images are recorded depends downwardly from the constant feed roller pair 60.

After the film F has been displaced the prescribed distance, desired images are successively photographed on the film F in other areas. During this time, a new film F from the supply magazine 26 is gripped by the first roller pair 40 in preparation for another imaging process therefor. After all desired images have been recorded on the film F in the image positioning mechanism 58, the stepping motor 64 is energized to rotate the roller 62a of the constant feed roller pair 60 in the direction of the arrow $C_2$ to displace the film F in the direction of the arrow $B_2$ from the image positioning mechanism 58 onto the guide plate 74 of the second feed mechanism 72. The film F which is fully transferred onto the guide plate 74 trips the limit switch 76 to de-energize the stepping motor 64.

Then, the new film F is fed into the image positioning mechanism 58, and the film F on the guide plate 74 is delivered into the receiving magazine 32. More specifically, the motor 44 is energized to rotate the drive shaft 44a thereof and the sprocket 46, and the rotative power of the sprocket 46 is transmitted via the chain 48 to the first roller pair 40 and the second roller pair 78. As a result, the new film F gripped by the first roller pair 40 is fed toward the image positioning mechanism 58, in which images will successively be photographed on the new film F in the same manner as described above. The previous film F on the guide plate 74 is delivered into the receiving magazine 32 at the same time that the new film F is delivered into the image positioning mechanism 58.

Figure 2:
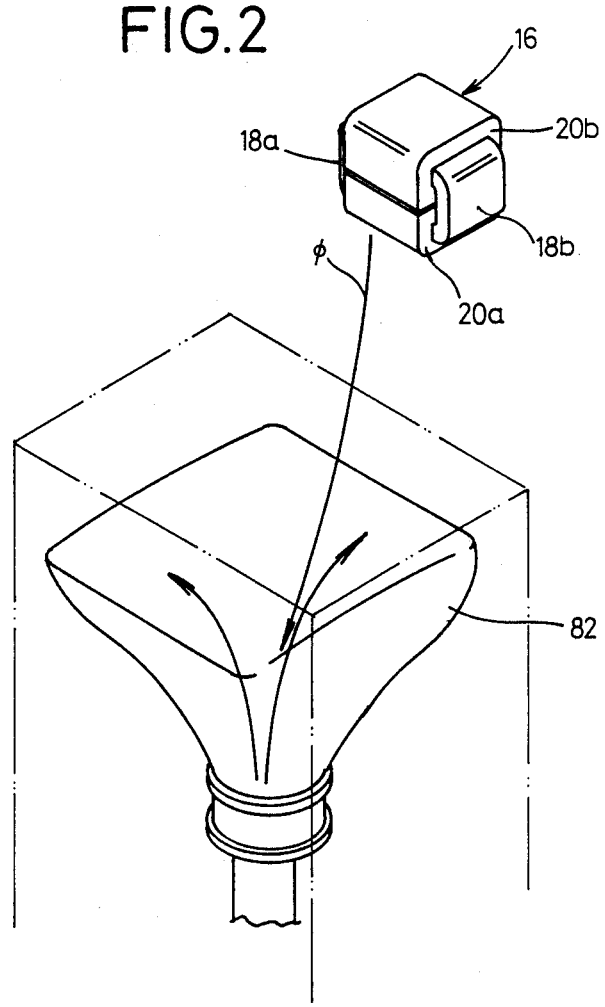
FIG. 2 is a schematic perspective view showing the direction of flux leakage from a cut-core transformer and the direction of an electron beam in a CRT monitor in the image photographing apparatus shown in FIG. 1.

The image photographing apparatus 10 is energized by a direct current under a relatively low voltage. To supply the required electric power, the AC voltage available from a commercial power supply is lowered to a desired lower AC voltage by the cut-core transformer 16, and the lowered AC voltage is rectified into a DC voltage by a rectifier (not shown). During operation of the cut-core transformer 16, magnetic fluxes $\phi$ are leaked from the cut-core transformer 16, as illustrated in FIG. 2. If the leaking magnetic fluxes $\phi$ interfered with the CRT monitor 82, the electron beam which travels in a certain direction in the CRT monitor 82 would not reach a prescribed position, thus disturbing the image displayed on the CRT screen.

According to the illustrated embodiment, the cut-core transformer 16 is substantially spaced from the CRT monitor 82. As indicated by the arrows in FIG. 2, furthermore, the cut-core transformer 16 is oriented such that the direction of the leakage fluxes $\phi$ from the cut-core transformer 16 is substantially parallel to the direction in which the electron beam is emitted or travels in the CRT monitor 82. Therefore, the leakage fluxes $\phi$ from the cut-core transformer 16 do not disturb images displayed on the CRT screen of the CRT monitor 82. More specifically, the flux density of the leakage fluxes φ from the cut-core transformer 16 is progressively lower in a direction away from the cut-core transformer 16 in proportion to the square of the distance from the cut-core transformer 16. Stated otherwise, the greater the distance from the cut-core transformer 16, the smaller the intensity of the magnetic field due to the leakage fluxes φ becomes in proportion to the square of that distance. Consequently, the effect that such magnetic field has on the electrom beam in the CRT monitor 82 is small. Moreover, since the direction of the leakage fluxes φ is substantially parallel to the direction in which the electrom beam is emitted in the CRT monitor 82, any forces acting on the electron beam due to the magnetic fluxes φ is very small. As a consequence, a desired image can accurately be displayed by the CRT monitor 82 without being adversely affected by the leakage fluxes φ. By exposing the film F to successive images on the CRT screen, therefore, high-quality images can be photographed on the film F.

With the present invention, as described above, the transformer for lowering the voltage of the commercial power supply to a voltage for energizing the image photographing apparatus is substantially spaced from the display unit such as the CRT monitor as much as possible, and the transformer is oriented such that the leakage fluxes from the transformer is directed substantially parallel to the electron beam which travels in the display unit. Consequently, the leakage fluxes from the transformer do not adversely affect the electrom beam in the display unit, so that a desired image can accurately be displayed on the display unit. As a result, the displayed image can be photographed with high accuracy.

Although a certain preferred embodiment has been shown and described, it should be understood that many changes and modifications may be made therein without departing from the scope of the appended claims.

What is claimed is:

1. An image photographing apparatus for photographing an image on a photosensitive medium comprising:
   an image-focusing optical mechanism for focusing the image of a displayed image on a photosensitive medium, said image-focusing optical mechanism including a display unit for displaying the image with an electron beam; and
   a transformer for producing a desired voltage for energizing said image photographing apparatus, said transformer being spaced from said display unit and oriented such that leakage fluxes from said transformer will be directed substantially parallel to the direction of an electron beam in said display unit.

2. An image photographing apparatus according to claim 1, wherein said tansformer comprises a cut-core transformer.

3. An image photographing apparatus according to claim 2, wherein said cut-core transformer comprises a pair of cores and a pair of coils wound respectively on said cores, said coils being juxtaposed in a direction toward said electron beam in the display unit.

4. An image photographing apparatus according to claim 1, wherein said display unit including a cathode ray tube having substantially a horizontal displaying surface is placed in a lower part of said apparatus and said transformer is placed at the top of said apparatus.

5. An image photographing apparatus as claimed in claim 1, further comprising:
   housing means for housing said image-focusing optical mechanism and said transformer, said housing means having a height, depth and width, wherein said transformer is spaced from said display unit by a distance which is a substantial portion of at least one of said height, depth and width of said housing means.

6. An image photographing apparatus as claimed in claim 5, wherein said transformer is more particularly spaced from said display unit by a distance which is a substantial portion of said height of said housing means.

* * * * *